(12) United States Patent
Barton et al.

(10) Patent No.: US 11,068,141 B1
(45) Date of Patent: Jul. 20, 2021

(54) DEVICE-BASED IMAGE MODIFICATION OF DEPICTED OBJECTS

(71) Applicant: Snap Inc., Santa Monica, CA (US)

(72) Inventors: Theresa Barton, San Mateo, CA (US); Yanping Chen, San Jose, CA (US); Jaewook Chung, Mountain View, CA (US); Christopher Yale Crutchfield, San Diego, CA (US); Aymeric Damien, London (GB); Sergei Kotcur, Sochi (RU); Igor Kudriashov, Saratov (RU); Sergey Tulyakov, Marina del Rey, CA (US); Andrew Wan, Marina del Rey, CA (US); Emre Yamangil, San Francisco, CA (US)

(73) Assignee: Snap Inc., Santa Monica, CA (US)

(*) Notice: Subject to any disclaimer, the term of this patent is extended or adjusted under 35 U.S.C. 154(b) by 5 days.

(21) Appl. No.: 16/265,355

(22) Filed: Feb. 1, 2019

Related U.S. Application Data

(60) Provisional application No. 62/625,861, filed on Feb. 2, 2018.

(51) Int. Cl.
| | |
|---|---|
| G06F 3/00 | (2006.01) |
| G06F 3/0484 | (2013.01) |
| G06K 9/00 | (2006.01) |
| G06F 3/0482 | (2013.01) |
| G06T 7/11 | (2017.01) |
| H04N 5/265 | (2006.01) |
| H04N 5/262 | (2006.01) |
| G06F 3/0481 | (2013.01) |

(52) U.S. Cl.
CPC ........ *G06F 3/04845* (2013.01); *G06F 3/0482* (2013.01); *G06K 9/00228* (2013.01); *G06K 9/00711* (2013.01); *G06T 7/11* (2017.01); *H04N 5/265* (2013.01); *H04N 5/2628* (2013.01); *G06F 3/04817* (2013.01); *G06T 2207/10016* (2013.01); *G06T 2207/20081* (2013.01); *G06T 2207/20084* (2013.01); *G06T 2207/20132* (2013.01); *G06T 2207/30201* (2013.01)

(58) Field of Classification Search
CPC ............... G06F 3/0482; G06F 3/04817; G06F 3/04845; G06T 7/11; G06T 2207/10016; G06T 2207/20081; G06T 2207/20084; G06T 2207/20132; G06T 2207/30201; H04N 5/2628; H04N 5/265; G06K 9/00228; G06K 9/00711
See application file for complete search history.

(56) References Cited

U.S. PATENT DOCUMENTS

| | | | | |
|---|---|---|---|---|
| 8,471,889 B1* | 6/2013 | Lee | ........................... | H04N 7/15 348/14.07 |
| 2008/0307307 A1* | 12/2008 | Ciudad | ................... | G06T 13/80 715/719 |
| 2012/0096356 A1* | 4/2012 | Ubillos | ................ | G11B 27/034 715/723 |

(Continued)

*Primary Examiner* — Anil N Kumar
(74) *Attorney, Agent, or Firm* — Schwegman Lundberg & Woessner, P.A.

(57) ABSTRACT

A system of machine learning schemes can be configured to efficiently perform image processing tasks on a user device, such as a mobile phone. The system can selectively detect and transform individual regions within each frame of a live streaming video. The system can selectively partition and toggle image effects within the live streaming video.

15 Claims, 14 Drawing Sheets

(56) References Cited

U.S. PATENT DOCUMENTS

| | | | |
|---|---|---|---|
| 2014/0369627 A1* | 12/2014 | Huang | G06K 9/00315 |
| | | | 382/309 |
| 2015/0248918 A1* | 9/2015 | Tang | H04N 21/47205 |
| | | | 715/719 |
| 2017/0109571 A1* | 4/2017 | McDuff | A61B 5/0077 |
| 2019/0122404 A1* | 4/2019 | Freeman | G06T 7/251 |

* cited by examiner

DEVICE-BASED IMAGE MODIFICATION OF DEPICTED OBJECTS

CLAIM FOR PRIORITY

This application claims the benefit of priority to U.S. Provisional Application No. 62/625,861, filed Feb. 2, 2018, which is hereby incorporated by reference in its entirety.

TECHNICAL FIELD

Embodiments of the present disclosure relate generally to device-based modification of a video stream. More particularly, but not by way of limitation, the present disclosure addresses systems and methods for modifying objects within images using neural networks.

BACKGROUND

Increasingly, users use their mobile client devices to capture and share images on different network platforms (e.g., social media network sites). Mobile client devices often have limited computing resources (e.g., lower power hardware processors, limited memory) and limited display space. Computing resources and display capabilities often limit or prohibit execution of complex image processing processes. Previous systems and mobile client devices have circumvented such limitations by passing computationally intensive image processing from a mobile client device to a networked computing device having suitable computational resources.

BRIEF DESCRIPTION OF THE DRAWINGS

Various ones of the appended drawings merely illustrate example embodiments of the present disclosure and should not be considered as limiting its scope.

Figure 1:
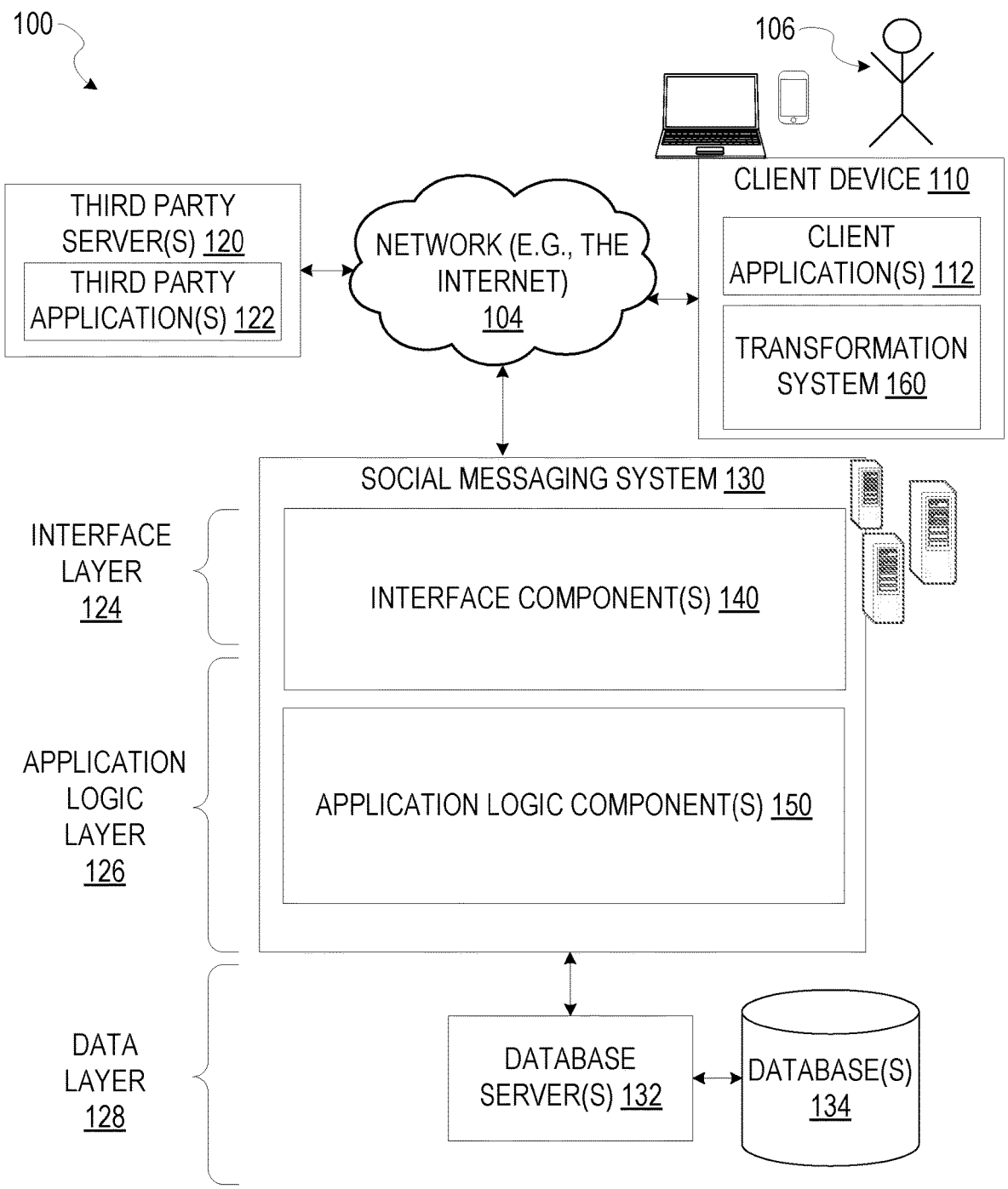
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed above, client-side complex imaging manipulations, e.g., neural network-based image modification or transformation, are not practical because processing the complex imaging schemes results in long processing times and a poor user experience. Further, such complex image manipulation may lead to increased power drain, resulting in shortened battery life of a mobile client device. Embodiments of a transformation system, described herein, can capture an image or video stream on a client device and perform complex image manipulations locally on the mobile client device while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on a client device.

In some example embodiments, a user may capture an image or video stream of the user (e.g., a selfie). The transform system determines the presence of a face within the image or video stream and provides modification icons. The modification icons include changes which may be the basis for modifying the user's face within the image or video stream. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured, and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled.

In some embodiments, the graphical user interface, presenting the modification performed by the transform system, may supply the user with additional interaction options. In such embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

The above is one specific example. The various embodiments of the present disclosure relate to devices and instructions by one or more processors of a device to perform device-based modification of an image or video stream. A transformation system is described that enables modification of objects within a video stream or image, in real time or near real time, using a local convolutional neural network.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third-party server(s) 120 executing third party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of transformation system 160 such that components of the transformation system 160 configure the client device 110 to perform a specific set of functions with respect to operations of the transformation system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the transformation system 160 to perform device-based image modification using a convolutional neural network.

Each client device 110 can comprise a computing device that includes at least a display and communication capabilities with the network 104 to access the social messaging system 130, other client devices, and third-party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the social messaging system 130 via the client device 110. The user 106 may not be part of the networked system 100 but may be associated with the client devices 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the transformation system 160 capable of device-based image modification using a neural network (e.g., a style transfer convolutional neural network trained to transfer an image of one style domain to another style domain). Similarly, the client device 110 includes at least a portion of the transformation system 160, as described above. In other examples, client device 110 may include the entirety of the transformation system 160. In instances where the client device 110 includes a portion of (or all of) the transformation system 160, the client device 110 can work alone or in cooperation with the social messaging system 130 to provide the functionality of the transformation system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the transformation system 160 may modify images using a convolutional neural network. The device may generate modified images in real time or near real time as a part of a generation of content for an ephemeral message.

Figure 2:
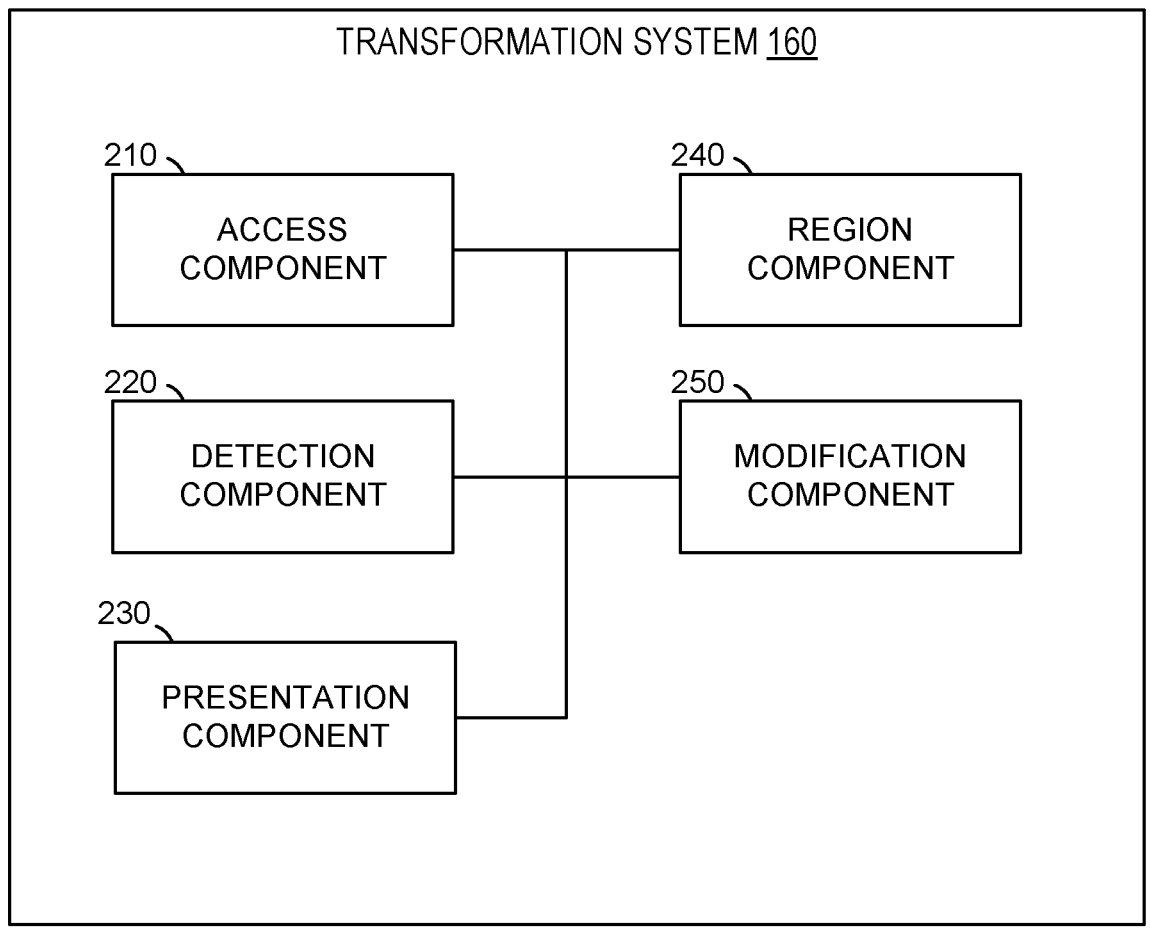
FIG. 2 is a diagram illustrating a transformation system, according to some example embodiments.

In FIG. 2, in various embodiments, the transformation system 160 can be implemented as a standalone system or implemented in conjunction with the client device 110 and is not necessarily included in the social messaging system 130. The transformation system 160 is shown to include an access component 210, a detection component 220, a presentation component 230, a region component 240, and a modification component 250. All, or some, of the components 210-250, communicate with each other, for example, via a network coupling, shared memory, and the like. Each component of components 210-250 can be implemented as a single component, combined into other components, or further subdivided into multiple components. Other components not pertinent to example embodiments can also be included but are not shown.

In some embodiments, one or more components of the transformation system 160 incorporate all or a portion of a neural network (e.g., convolutional neural network). The transformation system 160 may set convolution parameters for use by a convolution layers of a convolutional neural network. In some example embodiments, the convolutional parameters include setting the stride settings to stride one convolution. Further, in some example embodiments, the input images are resized to half the size (e.g., 2× resize, from 256×256 pixels to 128×128 pixels) or some other factor or fraction of the original size. In some embodiments, the input image size may be limited, and images segmented to fit the specified size. The transformation system 160 may identify input data to input into the convolutional neural network, such as segmented portions of an image, images, or frames of a video stream. For example, the transformation system 160 may identify the image generated by the user. The transformation system 160 may generate a low-rank matrix approximation of the convolution operator. In some example embodiments, the low-rank matrix approximation of the convolution operator enables the client device to use a convolutional neural network to generate modified versions of segmented portions of an image with fast inference speed, compact model size, and low energy consumption and apply the modified image segments to frames of a video stream to generate a modified video stream. This new approach enables fast convolution-based image modification using efficient approximations of tensor projections to significantly reduce the computational time of the convolution operator.

In particular, for example, suppose the input tensor is $X \in R^{H \times W \times I}$ where H and W denote, respectively, the height and width of the tensor, and I denotes the number of input channels. In some example embodiments, X is the input data which can be pre-processed, or the output of a fully connected neural network (e.g., a REctified Linear Unit (RELU)). Thus, without loss of generality: $X \geq 0$. In addition, let convolution kernel be configured as: $Y \in R^{N \times D \times D \times I}$, where N denotes the number of kernel output channels. In those example embodiments, the convolution method (e.g., TensorFlow® convolution operator) proceeds as follows:

(1) Flatten the kernel to a 2-D matrix with shape [H*W*I, O];
(2) Extract image patches from the input tensor to form a virtual tensor of shape [out_height, out_width, H*W*I];
(3) For each patch, right-multiply the filter matrix and the image patch vector.

In some example embodiments, the convolutional kernel is larger than zero, e.g., $Y \geq 0$, and can be represented using a set of separable rank-1 matrices, which enables efficient matrix completion techniques that are executable on a client device, e.g., client device 110. As a result, the convolution can be computed significantly more efficiently than existing approaches. Further, when $Y \geq 0$, the convolution output $Z = Y \circ X$ also satisfies $Z \geq 0$, so a non-negative bias term is used in the following ReLU layers.

Further consider the convolution operator for an interior point (i, j) and output channel n. The resulting value Z(n, i, j) can be computed as the following sum of I-dimensional real-valued dot products:

$$Z(n, i, j) = \sum_{d1=0}^{D-1} \sum_{d2=0}^{D-1} < X(i+d1, j+d2, \cdot), Y(n, d1, d2, \cdot) > \quad (1)$$

In the convolutional operator, all of the above dot products need to be computed explicitly which creates the need for significant computational resources, including computing architectures such as GPUs and TPUs. According to some example embodiments, the convolution is directed by computing only a small sample of all dot products in equation (1). This can be achieved by introducing additional structure into the convolutional kernel Y. More specifically, consider a bijective function $$\Pi: R^{D \times D \times I} \to R^{D \cdot D \times I} \quad (2)$$

Then, for each output channel n, $1 \leq n \leq N$, define the projection $\overline{Y}_n \in R^{(D \cdot D) \times I}$ of the kernel $Y(n, ., ., .)$ as $\overline{Y}_n = \Pi(Y(n, ., ., .))$. Furthermore, consider a bijective function $$\Psi: R^{H \times W \times I} \to R^{(H \cdot W) \times I} \quad (3)$$

and denote $\overline{X} = \Psi(X)$. Since rank $\overline{Y}_n = 1$, the matrix $\overline{Z}_n \in R^{(D \cdot D) \times (H \cdot W)}$, $\overline{Z}_n = \overline{Y}_n \overline{X}^T$ also has rank one. In addition, $\overline{Z}_n \geq 0$ as well. Furthermore, for each dot product $\langle X(i+d1, j+d2, .), Y(n, d1, d2, .) \rangle$ in equation (1) there exist indices $(k_1, k_2)$ such that $\overline{Z}_n(k_1, k_2) = \langle X(i+d_1, j+d_2, .), Y(n, d_1, d_2, .) \rangle$. Hence, the values of all the dot products needed for computing the convolution output $Z_n = Z(n, ., .)$ are contained in the matrix $\overline{Z}_n$.

Therefore, a method may be derived for fast computation of the matrix $\overline{Z}_n$, that would, in turn, accelerate the computation of the convolution output tensor Z. To accomplish that goal, it is proposed: computing $\overline{Z}_n(k_1, k_2)$ only for a small sample of indices $\Omega_n$. Then, use the information contained in $\overline{Z}_n(k_1, k_2)$, $(k_1, k_2) \in \omega_n$ to infer all entries of $\overline{Z}_n$. In order to do that, the sample size can satisfy $|\Omega_n| \geq D \cdot D + H \cdot W$, and at least one element needs to be sampled for each row and each column of $\overline{Z}_n$. Then, there exist vectors $u \in R^{D \cdot D}$, and $v \in R^{H \cdot W}$ such that $\overline{Z}_n = uv^T$. Formally, u and v present an optimal solution of the following optimization problem, $$\min_{u, v} \sum_{(k_1, k_2) \in \Omega n} \|\overline{Z}_n(k_1, k_2) - u(k_1) * u(k_2)\|^P \quad (5)$$

where $p \in R$, $p \geq 1$. In some cases, formulation (5) results in an indefinite Hessian of the objective function, and therefore remains computationally intractable even for the case when $p=1$ or $p=2$. The issue can be overcome by transforming problem (5) into an equivalent and computationally tractable formulation as follows, $$\min_{u, v} \sum_{(k_1, k_2) \in \Omega n} \|\log \overline{Z}_n(k_1, k_2) - u(k_1) * u(k_2)\|^P \quad (6)$$

Figure 3:
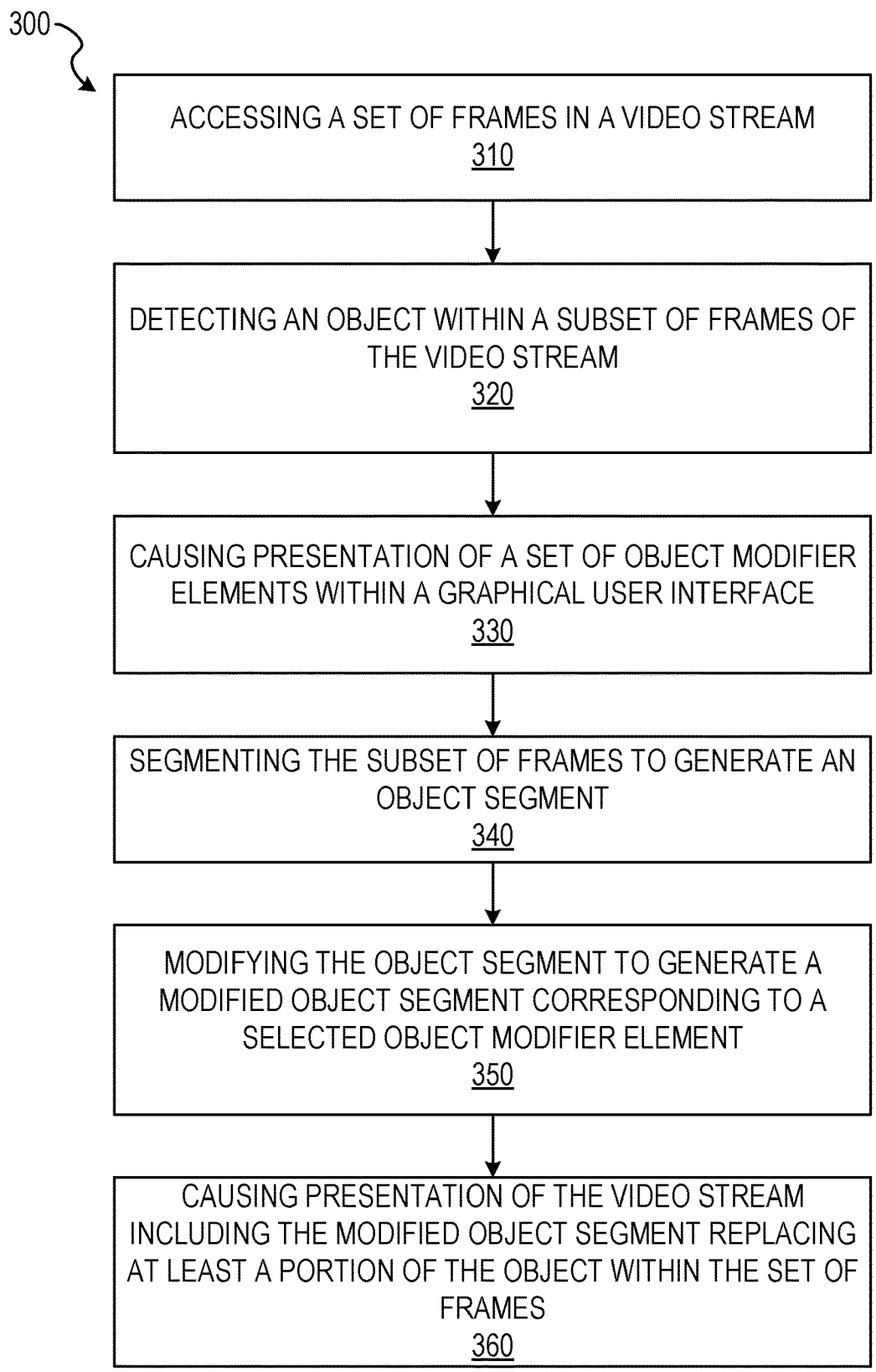
FIG. 3 is a flow diagram illustrating an example method for modifying objects within a video stream using a local convolutional neural network, according to some example embodiments.

Then, the matrix $\overline{Z}_n$ is inferred as $\overline{Z}_n = \exp(u^*)\exp(v^*)^T$. When $p=1$, problem (6) presents a linear programming problem which can be solved efficiently. However, that would also require the use of a linear programming solver, which may not always be readily available. Still, when $p=2$ problem (6) has a smooth quadratic objective function. In that case, find a closed form for the optimal solution $(u^*, v^*)$ using the Karush-Kuhn-Tucker optimality conditions. More specifically, $$\begin{bmatrix} u^* \\ v^* \end{bmatrix} = (A_n^T A_n)^{-1} A_n^T vec(\log \overline{Z}_n(\Omega_n)) \quad (7)$$

where the matrix $A_n \in \{0, 1\}^{|\Omega n| \times (D \cdot D + H \cdot W)}$ the equation matrix corresponding to the objective function of problem (6). Thus, when $p=2$, solve problem (6) without the use of a third-party solver. In addition, pre-compute the matrix $M_n = (A_n^T A_n)^{-1} A_n^T$ in advance. In that case, solving the matrix completion problem (6) reduces to a single matrix-vector multiplication which can be done efficiently and reliably at runtime. Furthermore, such an approach is fast and easy to implement. In addition, use the same matrix sample $\omega_n$ for all different output channels $1 \leq n \leq N$. In that case, only compute and store a single matrix M such that $M = M_n$, $1 \leq n \leq N$. The proposed method can be used for various other partitions of the convolutional kernel Y. For instance, combine multiple output channels into a single matrix $\overline{Z}_n$, or use multiple matrices $\overline{Z}_n^1$, $\overline{Z}_n^2$ ... for a single output channel $1 \leq n \leq N$. In practice, use the latter option since it allows us to achieve a balance between computational speed, memory requirements, model size, and numerical performance FIG. 3 depicts a flow diagram illustrating an example method 300 for modifying objects within a video stream, according to some example embodiments. The operations of method 300 may be performed by components of the transformation system 160 and are so described below for purposes of illustration. In operation 310, the access component 210 receives or otherwise accesses one or more images depicting one or more objects, such as human faces. In some embodiments, the access component 210 receives the one or more images as a video stream or frames of a video stream captured by an image capture device associated with the client device 110 and presented on a user interface of an image transformation application. The access component 210 may include the image capture device as a portion of hardware comprising the access component 210. In these embodiments, the access component 210 directly receives the one or more images or the video stream captured by the image capture device. In some instances, the access component 210 passes all or a part of the one or more images or the video stream (e.g., a set of images comprising the video stream) to one or more components of the transformation system 160, as described below in more detail.

In operation 320, the detection component 220 detects an object within a subset of frames of the set of frames of the video stream. For example, the objects may be depicted within a graphical user interface of client device displaying an image of the video stream. In some embodiments, the object within the set of frames is a face of a user or a subject depicted within one or more frames of the video stream. The detection component 220 may detect the object, such as a face or faces, using one or more detection techniques. For example, where the object is a face or set of faces, the detection component 220 may use one or more facial analysis techniques to detect a presence of the face or set of faces. In some example embodiments, the detection component 220 may employ facial landmarks, pattern matching, outline matching, histogram matching, or any other suitable mechanism to detect the face. In some instances, the detection component 220 detects the object using one or more layers of a neural network, a convolutional neural network, or a convolutional neural network that are trained for object detection. Upon detection, the objects may be provided with a border (e.g., user interface face border elements), for a period of time, to indicate detected objects to the user of the client device.

In some example embodiments, the detection component 220 comprises an image segmentation neural network that is trained to detect and label each pixel of the image as belonging to one of a plurality of region categories. For example, the detection component can detect face areas of an image and label each pixel corresponding to the face areas, and label non-face areas and label each pixel as corresponding to non-face areas.

In operation 330, the presentation component 230 causes presentation of a set of object modifier elements within a graphical user interface. The object modifier elements may be presented within the graphical user interface proximate to one another. The set of object modifier elements may represent predetermined modifications which may be applied to the object within the video stream. The presentation component 230 may cause presentation of the set of object modifier elements based on detection of the object. For example, where the detected object is a face, the object modifier elements may comprise face modifier elements representing modifications to be applied to the face within the video stream. In some embodiments, selection of a modification, represented by an object modifier element, may trigger the transformation system 160 to segment and modify the underlying frames of the video stream, as described in more detail below.

In operation 340, the region component 240 partitions the subset of frames to generate an object partition or crop. In some embodiments, the region component 240 partitions the subset of frames by cropping the subset of frames to isolate the face as detected by detection component 220 and generate a set of cropped frames. The region component 240 may crop the subset of frames by removing from consideration areas of the frame which do not contain a portion of the object. For example, the region component 240 may identify an outline of the object and remove areas of the frame, outside of the outline, from consideration. As an additional example, the region component may detect areas of an image segmentation mask that correspond to face areas and save each of the face areas as a cropped image. In some example embodiments, after cropping the region component 240 may then normalize the set of cropped images. In some embodiments, the region component 240 normalizes the set of cropped images based on one or more of a size, a shape, a color or histogram distribution, or any other suitable normalization.

In operation 350, the modification component 250 modifies the object segment to generate a modified object segment. In some embodiments, the modified object segment corresponds to a selected object modifier element. As discussed above, where the object is a face detected within the video stream, the modification component 250 modifies the face segment to generate a modified face segment according to the selected face modifier element. The detection component 220, the region component 240, and the modification component 250 may use the trained convolutional neural networks to process the user image or frames of the video stream to generate modified versions of the user image.

In some example embodiments, the modification component comprises a plurality of image processing convolutional neural networks, each trained to apply a different image effect. For example, a first style transfer neural network can be trained to transfer images to a smile domain (e.g., apply a smile effect to an input image), a second style transfer neural network model can be trained to transfer an input image to an elderly person domain (e.g., apply an aging effect to a crop of a user's face), a third shifting convolutional neural network can be trained to apply a hair color effect to an input image, and so on.

In some embodiments, the object portion (e.g., the face portion) is in a first configuration. For example, where the object segment is a face, the face segment may be positioned in a first configuration such as a smile or other facial expression. The modification component 250 may modify the face segment by transforming the face segment from the first facial configuration to a second facial configuration (e.g., a frown). In some embodiments, the modification component 250 uses a style transfer convolutional neural network to transform the facial expression and generate the modified facial segment with the second facial configuration. The second facial configuration or second object configuration may correspond to the object modifier element or face modifier element selected in operation 330, 340, or 350.

The modification component 250 may modify the video stream to generate a modified video stream by incorporating the modified face segment into the video stream. In some embodiments, the modification component 250 replaces the face of the set of frames with the modified face segment. The modification component 250 then integrates the modified face segment with at least a portion of each frame in the video stream depicting the face. In some embodiments, the modification component 250 integrates the modified face segment by blending edges of the modified face segment or edges of the face proximate to a suitable position of the modified face segment.

In operation 360, the presentation component 230 causes presentation of a modified video stream. The modified video stream may contain or include the modified object segment. The modified object segment may replace at least a portion of the object depicted within the set of frames of the video stream.

Figure 4:
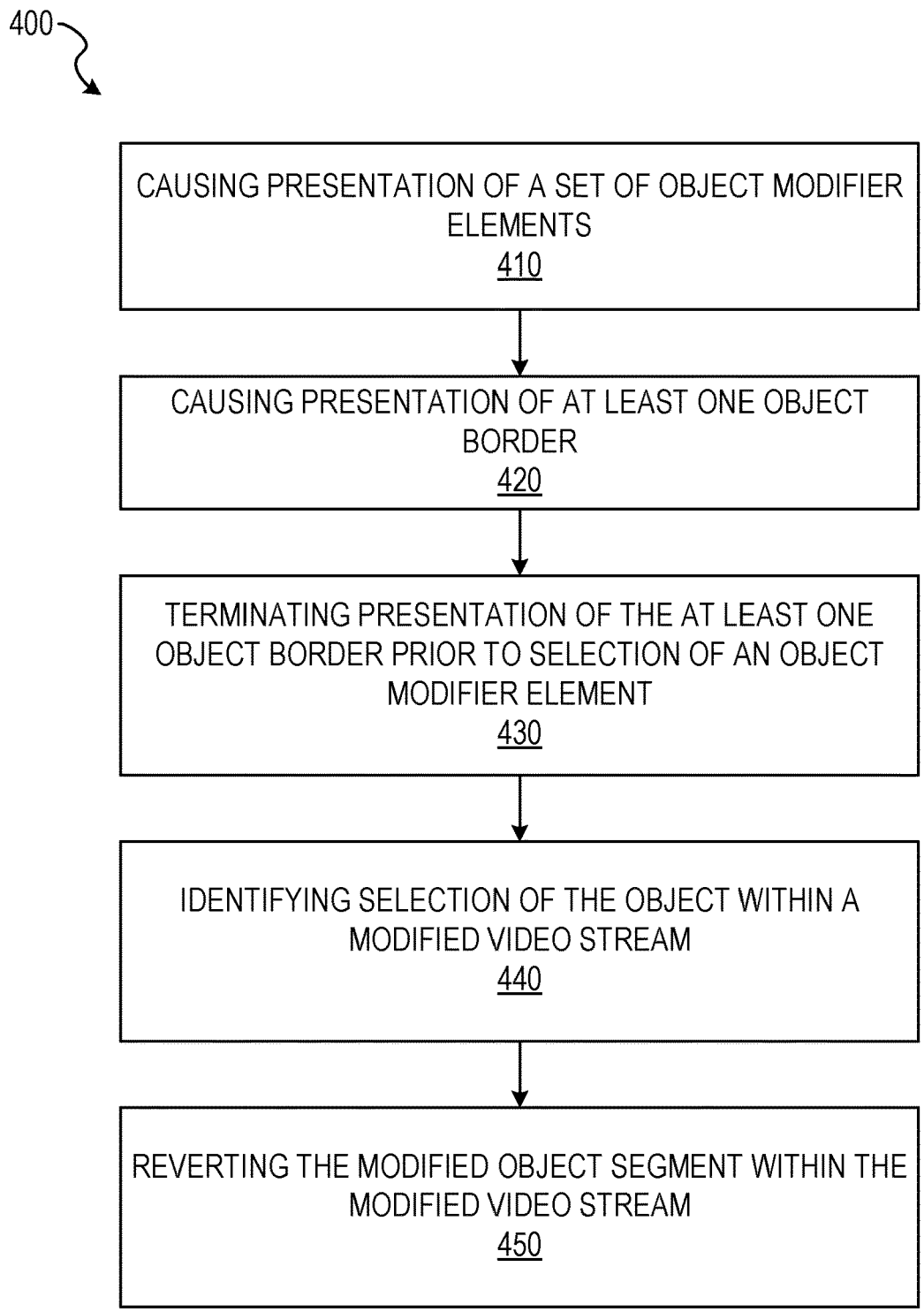
FIG. 4 is a flow diagram illustrating an example method for modifying objects within a video stream using a local convolutional neural network, according to some example embodiments.

FIG. 4 depicts a flow diagram illustrating an example method 400 for modifying objects within a video stream using a machine learning scheme (e.g., a convolutional neural network). The operations of method 400 may be performed by components of the transformation system 160. In some instances, certain operations of the method 400 may be performed using one or more operations of the method 300 or as sub-operations of one or more operations of the method 300.

In operation 410, the presentation component 230 causes presentation of a set of object modifier elements within a graphical user interface. In some embodiments, the presentation component 230 causes presentation of the set of object modifier elements in response to receiving the video stream and detecting the object (e.g., the face) within at least a portion of the set of frames of the video stream.

In operation 420, the presentation component 230 causes presentation of at least one object border. Where the object is a face, the presentation component 230 causes presentation of a facial border. The facial border may outline a face within the set of frames in the video stream. In some embodiments, the object border is presented in response to detection of the object within the frames of the video stream (e.g., detection of the object in operation 320). In some instances, the presentation component 230 causes presentation of the object border upon detection of the objects and causes presentation of the set of object modifier elements after the at least one object border has been presented.

In operation 430, the presentation component 230 terminates presentation of the at least one object border prior to selection of an object modifier element. In some embodiments, the presentation component 230 terminates presentation of the at least one object border based on a predetermined time period. In such embodiments, the object border may be assigned a predetermined time period. Once the object border is presented or presentation of the object border is triggered, a counter may be initiated. The counter may be a clock, a timer, or any other suitable mechanism to track a duration of the presentation of the object border. When the counter indicates the predetermined time period has elapsed, the presentation component 230 may terminate presentation of the at least one object border by ceasing presentation of the object border. In some instances, the object border is displayed as an overlay, a layer, or a graphical element positioned proximate to or around at least a portion of the object. The presentation component 230 may terminate presentation of the object border by removing or ceasing presentation of the layer, overlay, or graphical element.

In operation 440, the presentation component 230 may identify selection of the object (e.g., the face) within the modified video stream. In some embodiments, operation 440 is performed after operation 350 presents the modified video stream. Selection of the object may be identified via the graphical user interface and input components of a client device. For example, a touch screen of the client device may identify contact with a portion of the screen. The presentation component 230 may identify the contact as proximate to or in contact with a portion of the depiction of the object within the graphical user interface.

In operation 450, the modification component 250 reverts the modified object segment (e.g., the modified face segment) within the modified video stream. The modified object segment may be reverted to the initial or original object segment within the set of frames in the video stream. In some embodiments, the reversion places the object segment and the video stream in the initial or original state received by the access component 210 in operation 310. The reversion of the modified object segment may be responsive to or based on selection of the object identified in operation 440.

Figure 5:
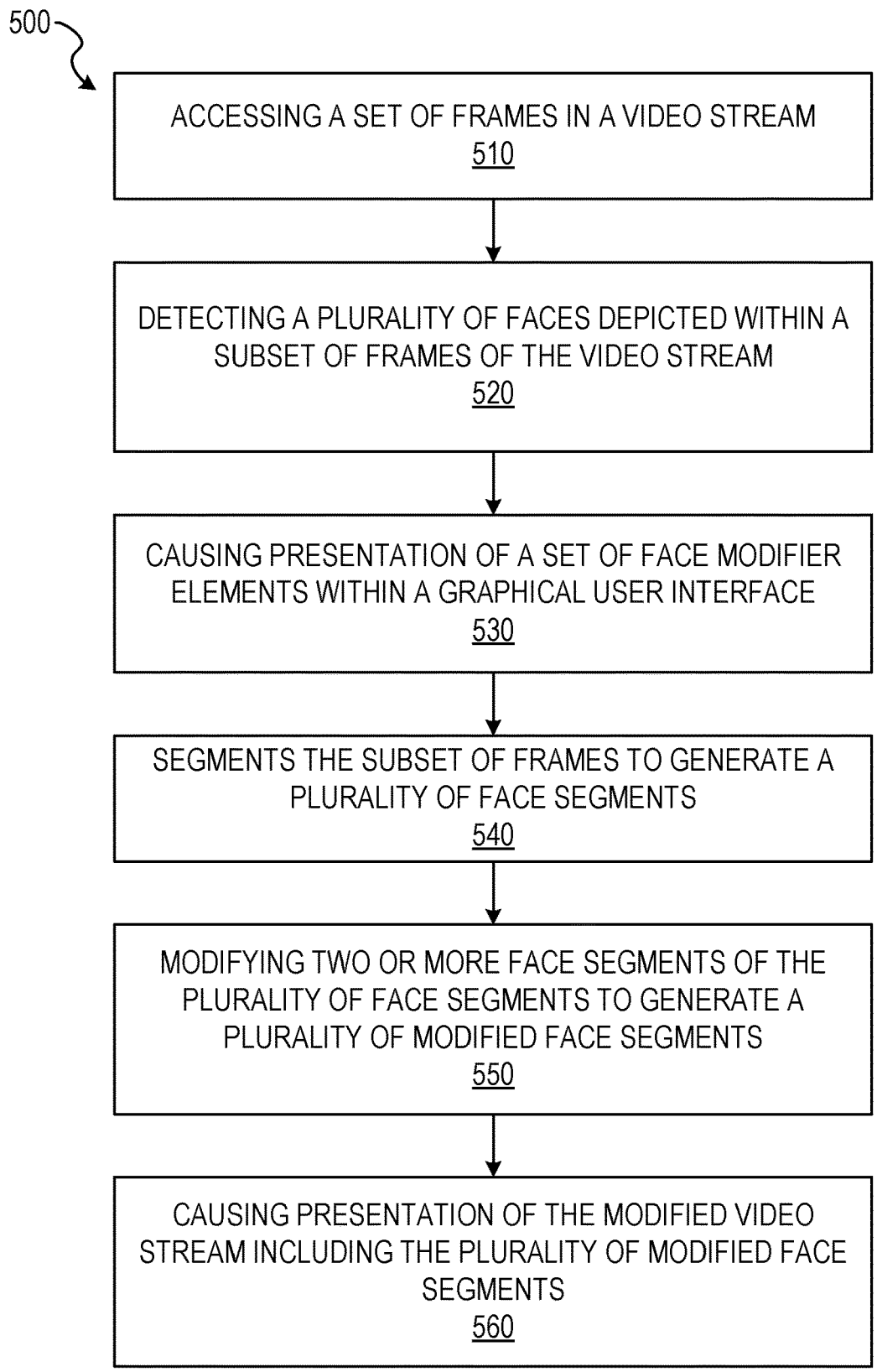
FIG. 5 is a flow diagram illustrating an example method for modifying objects within a video stream using a local convolutional neural network, according to some example embodiments.

FIG. 5 depicts a flow diagram illustrating an example method 500 for modifying objects within a video stream using machine learning scheme, according to some example embodiments. The operations of method 500 may be performed by components of the transformation system 160. In some instances, certain operations of the method 500 may be performed using one or more operations of the method 300 or the method 400 or as sub-operations of one or more operations of the method 300 or the method 400, as will be explained in more detail below.

In operation 510, the access component 210 accesses a set of frames in a video stream. The access component 210 may access the set of frames in a manner similar to or the same as described above with respect to operation 310. In operation 520, the detection component 220 detects a plurality of faces depicted within the subset of frames of the video stream. Each face of the plurality of faces may be detected in a manner similar to or the same as described above with respect to operation 320.

In operation 530, the presentation component 230 causes presentation of a set of face modifier elements within a graphical user interface. In some embodiments, the presentation of the face modifier elements is performed based on detection of the face in operation 520. The set of face modifier elements may be presented in a manner similar to or the same as described above with respect to operation 330. In operation 540, the region component 240 segments the subset of frames to generate a plurality of face segments. Each face segment may correspond to a face of the plurality of faces depicted within the subset of frames. Segmentation of the subset of frames, with respect to each face segment, may be performed in a manner similar to or the same as described above with respect to operation 340.

In operation 550, the modification component 250 modifies two or more face segments of the plurality of face segments to generate a plurality of modified face segments. The plurality of modified face segments may correspond to a selected face modifier element. Modification of each face segment of the two or more face segments may be performed in a manner similar to or the same as described above with respect to operation 350.

In operation 560, the presentation component 230 causes presentation of the modified video stream including the plurality of modified face segments. The video stream may be modified to include the modified face segments by replacing at least a portion of the faces, corresponding to the two or more face segments depicted within the set of frames of the video stream, with the appropriate modified face segments in real time or near-real time.

Figure 6A:
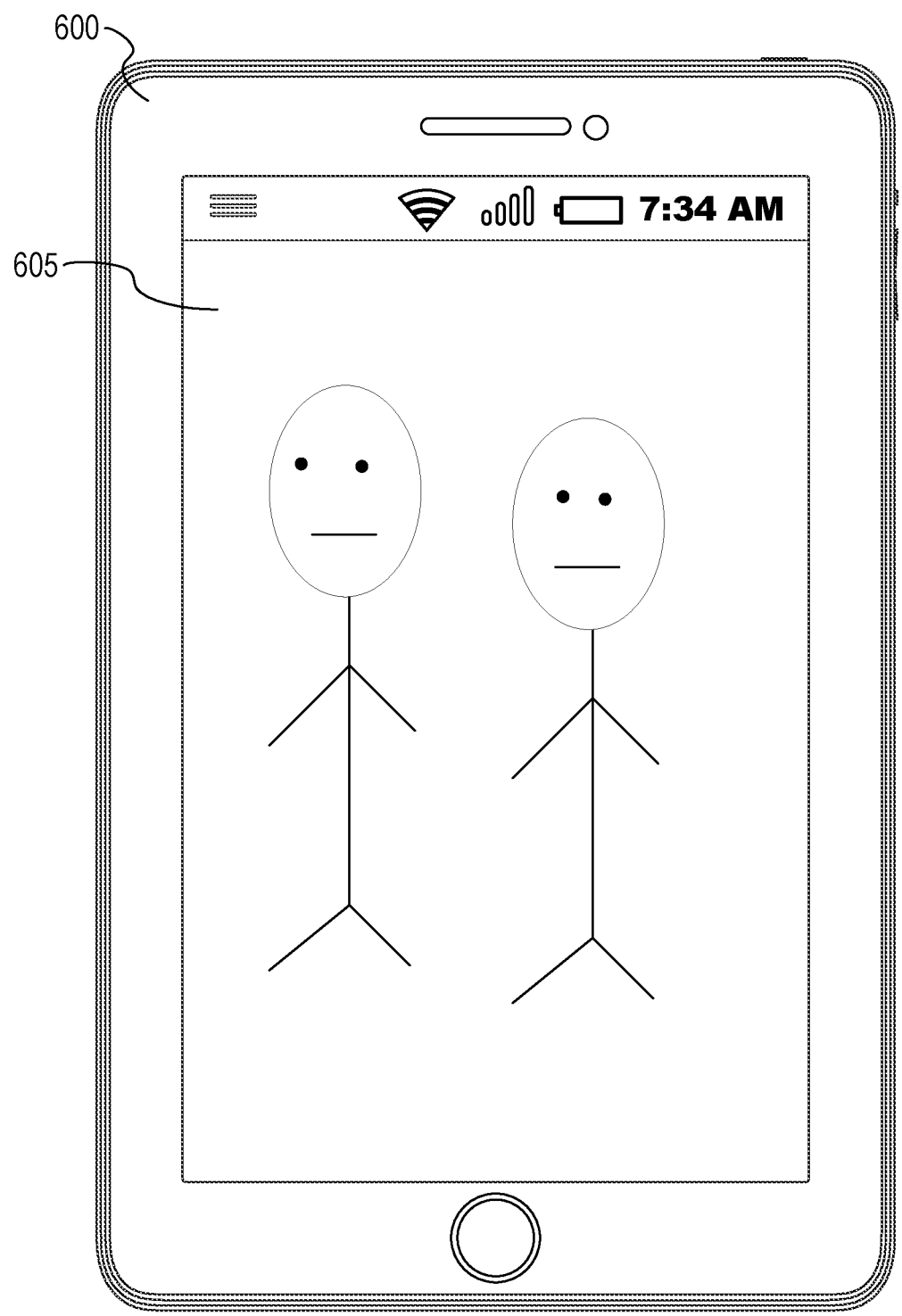
FIGS. 6A-6C display example approaches for processing detected objects, according to some example embodiments.
Figure 6B:
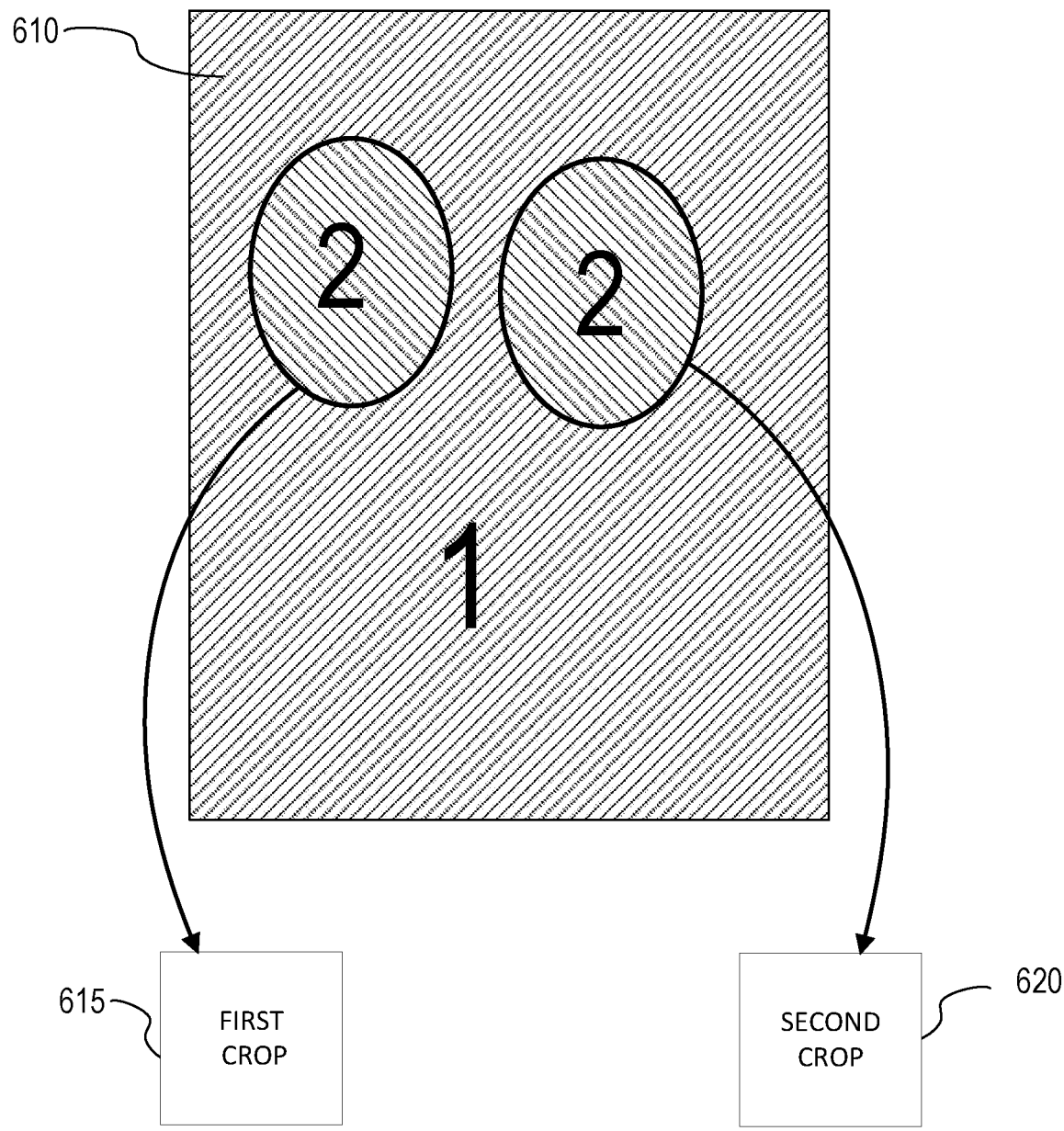
Figure 6C:
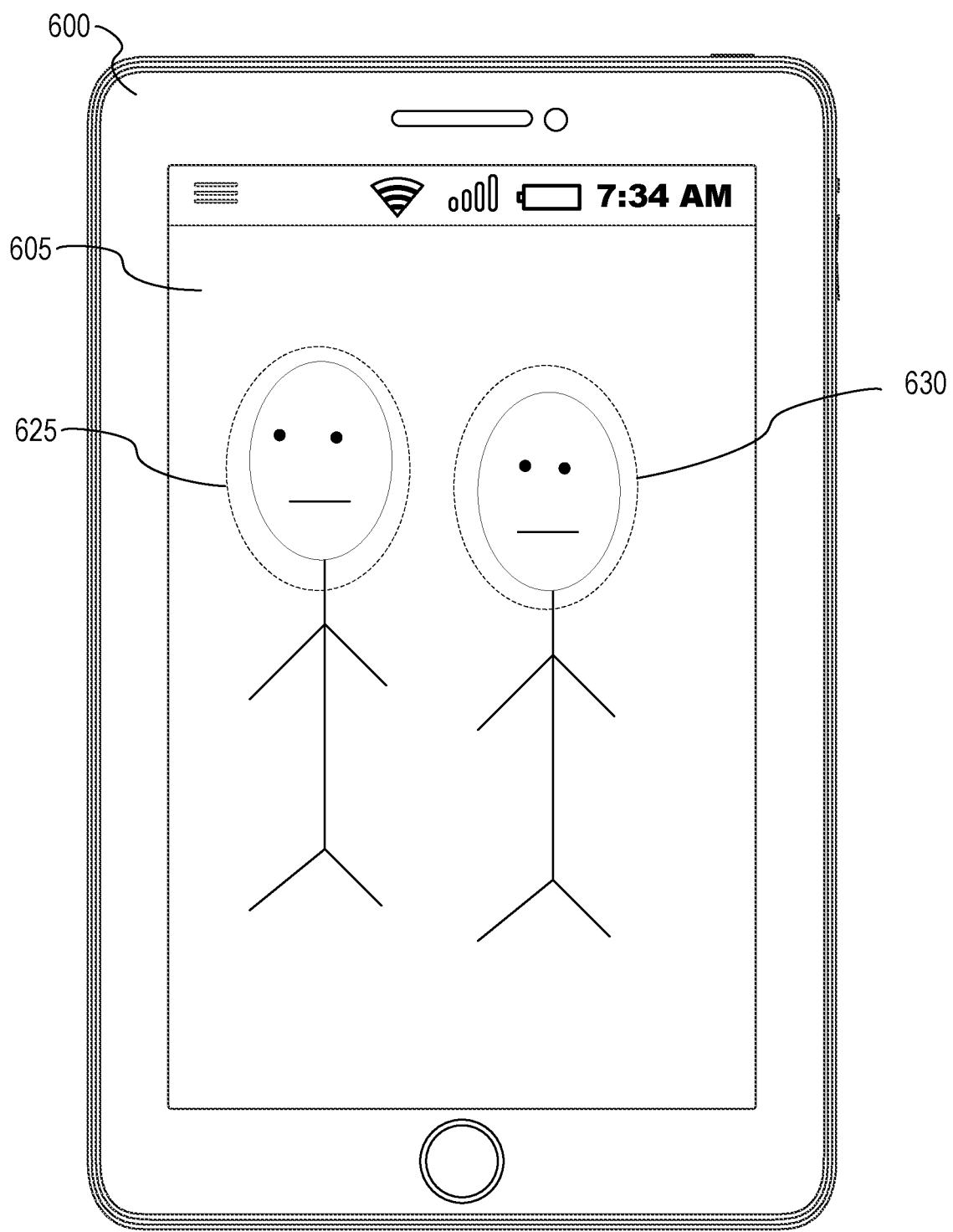

FIGS. 6A-6C show example user interfaces for processing of object portions of an image, according to some example embodiments. In FIG. 6A, a client device 600 is displaying an image 605 of a video feed that is dynamically captured and displayed on the client device. In the following example, a single image is discussed for explanatory purposes, but it is appreciated that the processes can be applied to each image of the video stream in real-time or near real time. In FIG. 6A, in response to generation or accessing of the image 605 in the video feed, an object detection convolutional neural network is applied to the image to detect the faces.

In some example embodiments, image segmentation is performed on the image 605 to detect the objects, create crops, and display object borders. For example, FIG. 6B shows an example in which an image segmentation convolutional neural network has been applied to image 605 to generate image mask 610. The image mask 610 has two areas: pixels that do not correspond to human face areas are labeled "1" in image mask 610 and pixels of image correspond (e.g., depict) human face areas are labeled as "2" in image mask 610. In some example embodiments, each of the areas that correspond to a certain type of area are cropped and stored for further processing. For example, each of the human face areas are cropped from the image 605 (in FIG. 6A) and stored as first crop 615 and second crop 620.

FIG. 6C shows example face borders, according to some example embodiments. After detection of the human face areas from object detection or from image segmentation, face border areas 625 and 630 are displayed on image 605 to indicate that two human faces are depicted. In some example embodiments, the face border areas pulsate or momentarily change their visual appearance to indicate that they are selectable. In some example embodiments, the face border areas disappeared 625 after a period of time as discussed above. Further, in some example embodiments, the face border areas 625 and 630 remain visible until unselected or toggled off by the user.

Figure 7A:
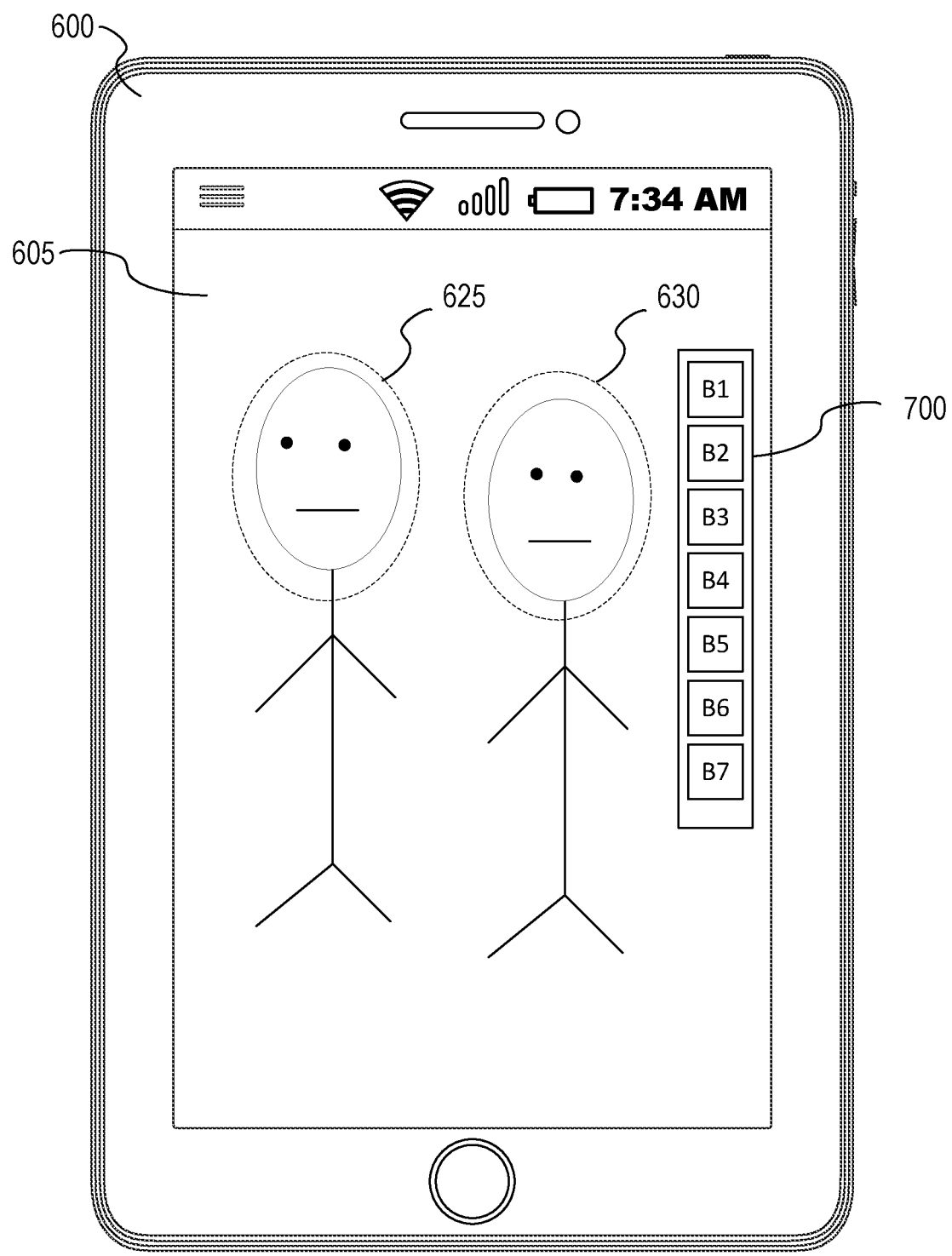
FIGS. 7A-7C display user interfaces for processing detected objects, according to some example embodiments.
Figure 7B:
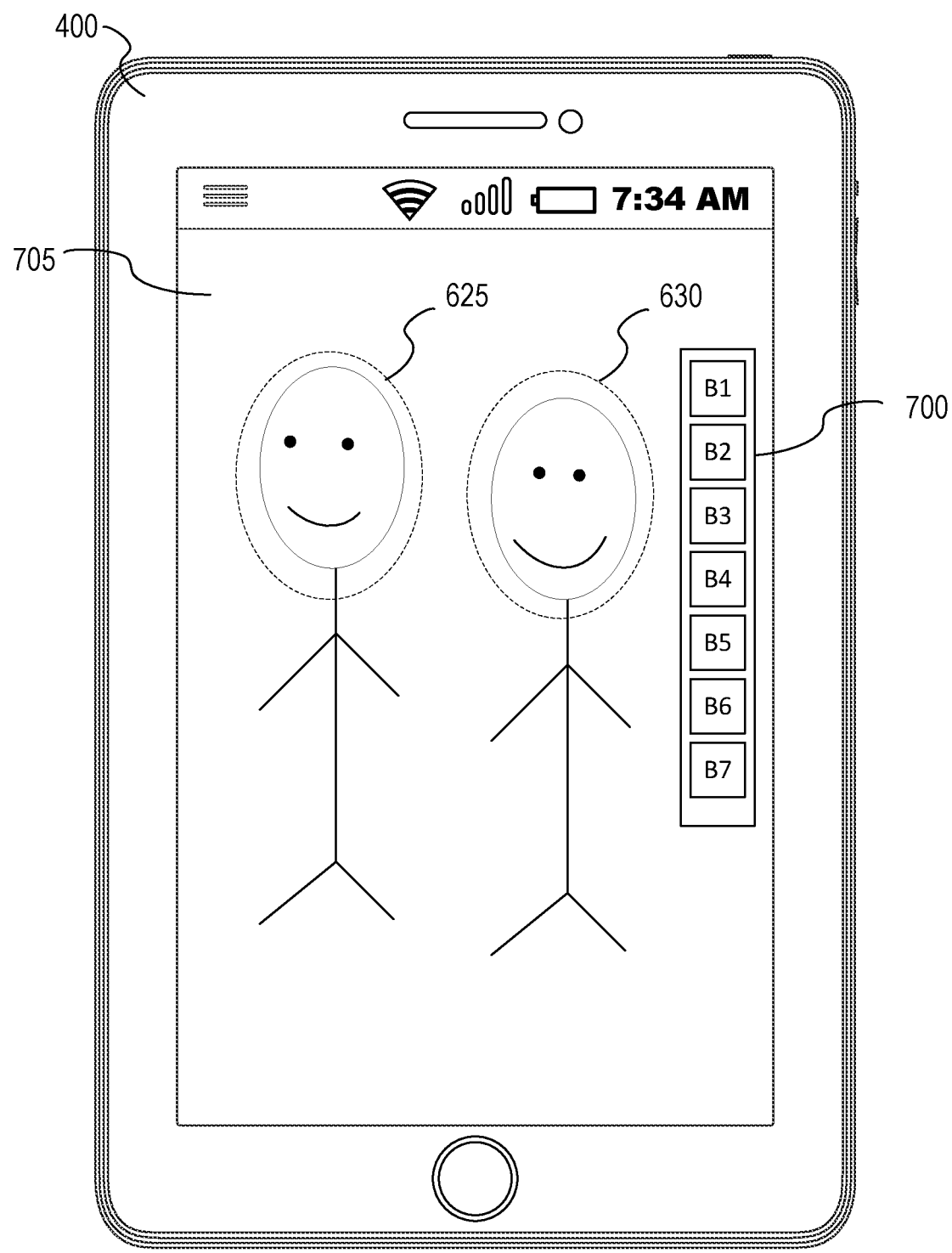
Figure 7C:
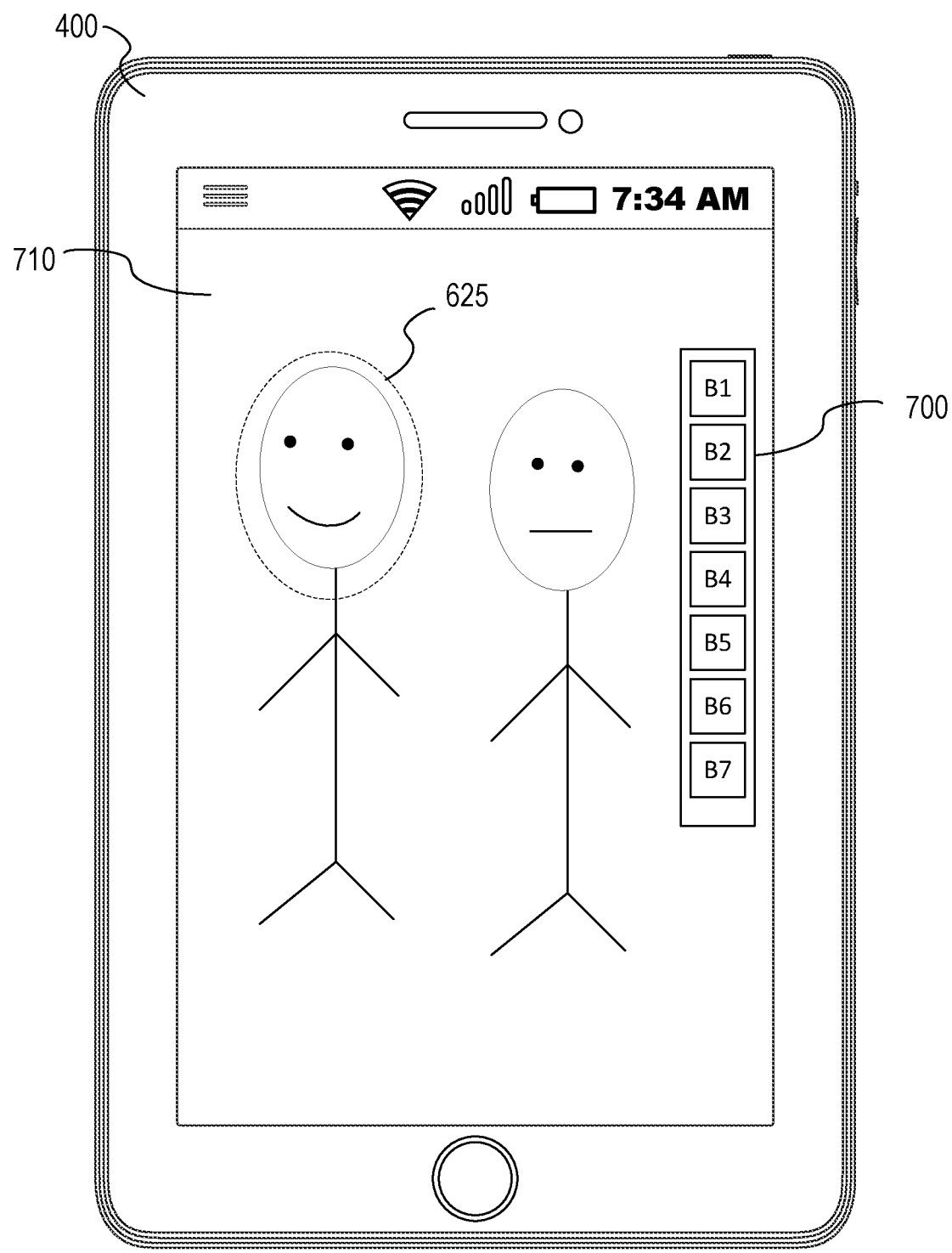

FIGS. 7A-7C show example user interfaces for applying image effects to an image or video stream, according to some example embodiments. In FIG. 7A, modifier elements 700 are displayed in response to detection of the human faces. The modifier elements comprise a plurality of buttons B1-B7. Each of the buttons corresponds to an image effect to be applied by a neural network trained for the specified effect. For example. The first button "B1" can be a smile effect that triggers a smile-effect image style transfer neural network to be applied to face areas of 605, and the second button "B2" can be an elderly effect that triggers an elderly effect image style transfer to be applied to face areas, and so on.

FIG. 7B shows an example modified image 705 generated in response to the user selecting the first button "B1", according to some example embodiments. After selection of the first button "B1", the smile-effect image style transfer neural network is applied to the first crop 615 and the second crop 620 to change the depicted faces from not smiling to smiling face crops. The smiling face crops are then blended into image 605 to generate modified image 705.

FIG. 7C shows a reverted modified image 710, according to some example embodiments. In response to the user selecting the face border element 730 a new reverted modified image is generated. In some example embodiments, the reverted modified image 710 is generated by only applying the smiling crop to image 605 (FIG. 6) while leaving the right most human face un-smiling. In this way, the user of client device 600 can toggle neural network effects off and on individual faces depicted in an image or video stream. For example, after toggling off the smile effect for border area 630, the user can select B2 to apply an elderly effect to the border area 630.

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Figure 8:
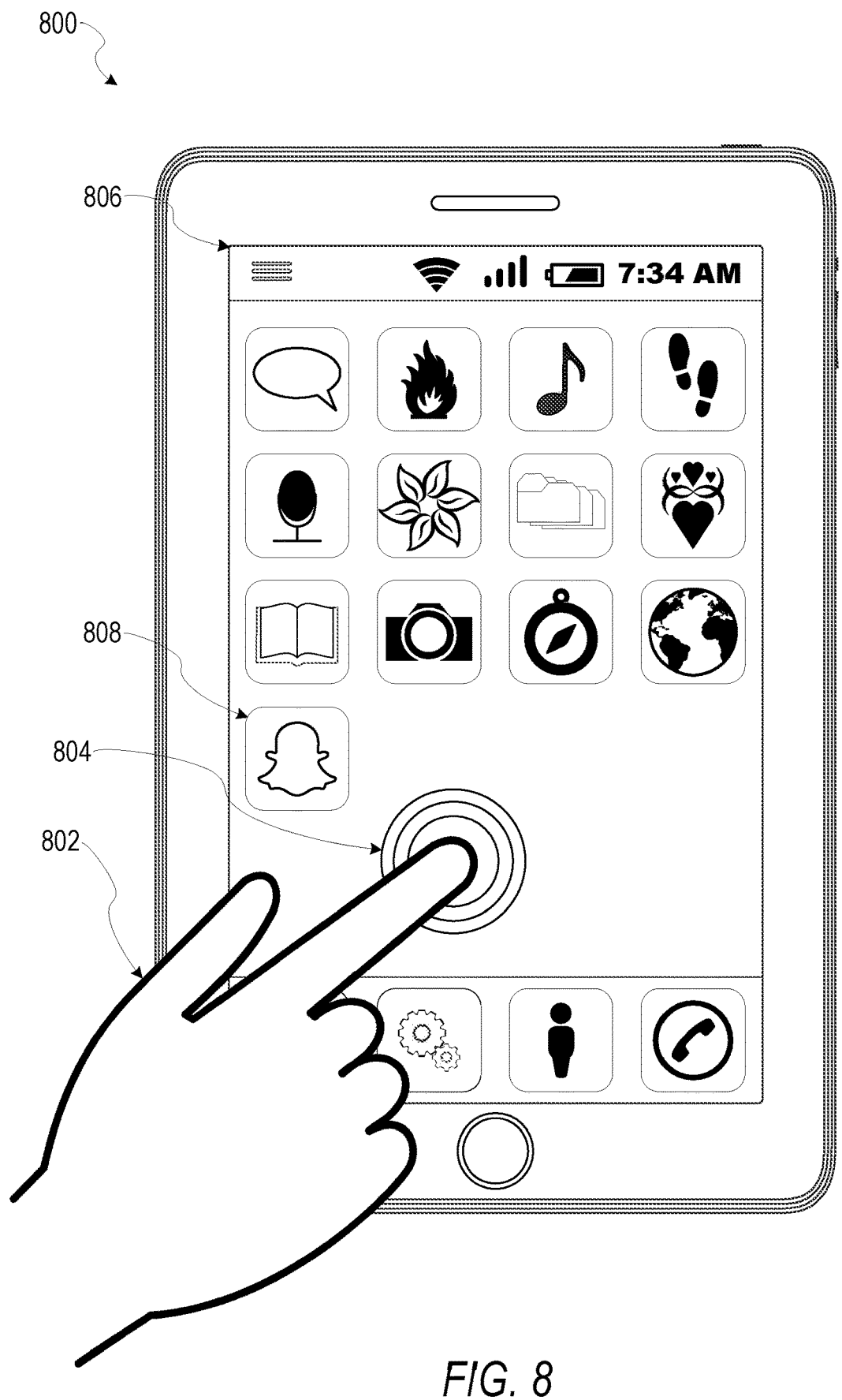
FIG. 8 is a user interface diagram depicting an example mobile device and mobile operating system interface, according to some example embodiments.

FIG. 8 illustrates an example mobile device 800 executing a mobile operating system (e.g., IOS™, ANDROID™, WINDOWS® Phone, or other mobile operating systems), consistent with some embodiments. In one embodiment, the mobile device 800 includes a touch screen operable to receive tactile data from a user 802. For instance, the user 802 may physically touch 804 the mobile device 800, and in response to the touch 804, the mobile device 800 may determine tactile data such as touch location, touch force, or gesture motion. In various example embodiments, the mobile device 800 displays a home screen 806 (e.g., Springboard on IOS™) operable to launch applications or otherwise manage various aspects of the mobile device 800. In some example embodiments, the home screen 806 provides status information such as battery life, connectivity, or other hardware statuses. The user 802 can activate user interface elements by touching an area occupied by a respective user interface element. In this manner, the user 802 interacts with the applications of the mobile device 800. For example, touching the area occupied by a particular icon included in the home screen 806 causes launching of an application corresponding to the particular icon.

The mobile device 800, as shown in FIG. 8, includes an imaging device 808. The imaging device 808 may be a camera or any other device coupled to the mobile device 800 capable of capturing a video stream or one or more successive images. The imaging device 808 may be triggered by the transformation system 160 or a selectable user interface element to initiate capture of a video stream or succession of images and pass the video stream or succession of images to the transformation system 160 for processing according to the one or more methods described in the present disclosure.

Many varieties of applications (also referred to as "apps") can be executing on the mobile device 800, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 800 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 800 includes a social messaging app 810 such as SNAPCHAT® that, consistent with some embodiments, allows users to exchange ephemeral messages that include media content. In this example, the social messaging app 810 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the transformation system 160 may modify objects within a video stream using a local convolutional neural network within the ephemeral message and transmit the ephemeral message to another device using the ephemeral message system.

Figure 9:
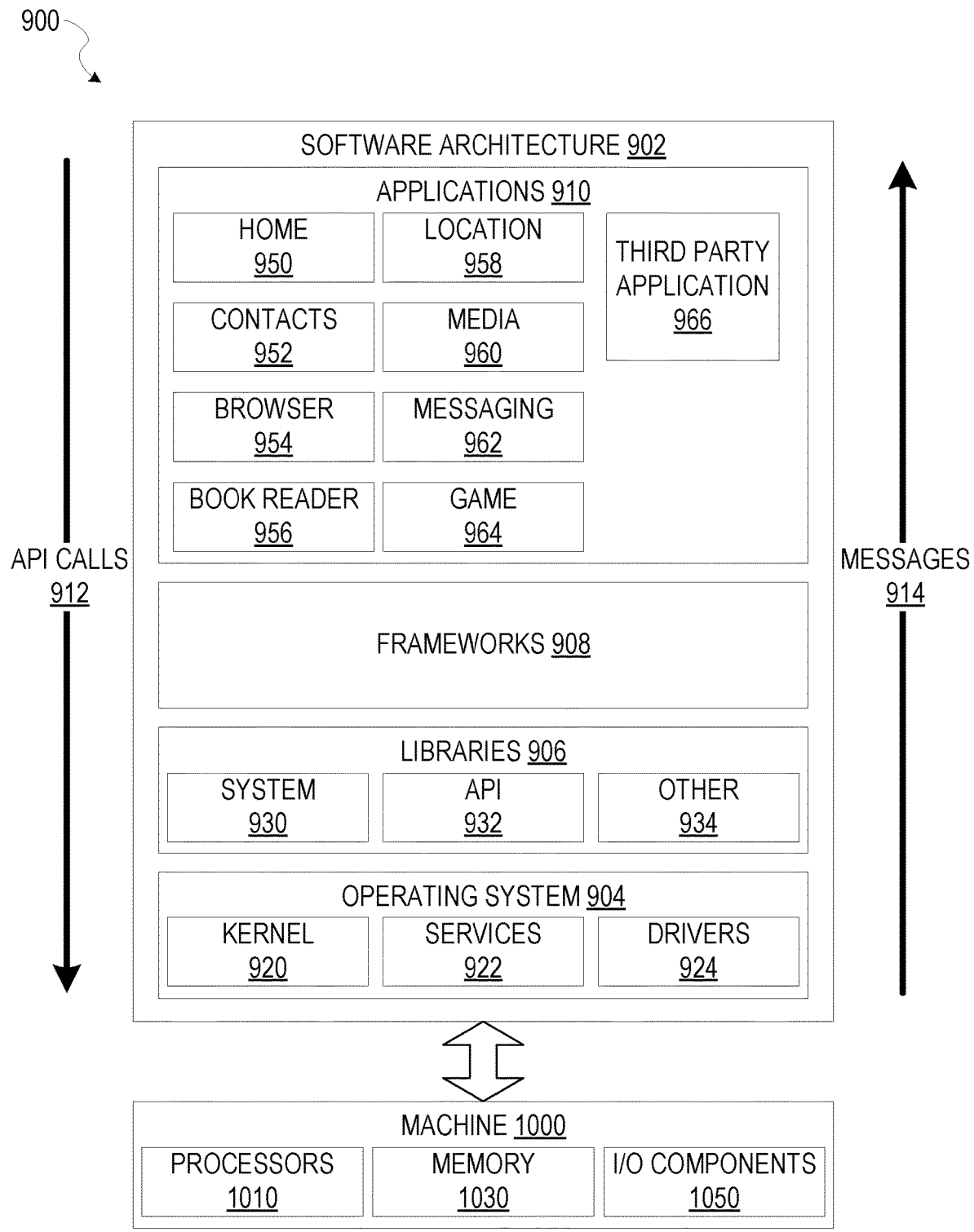
FIG. 9 is a block diagram illustrating an example of a software architecture that may be installed on a machine, according to some example embodiments.

FIG. 9 is a block diagram 900 illustrating an architecture of software 902, which can be installed on the devices described above. FIG. 9 is merely a non-limiting example of a software architecture, and it will be appreciated that many other architectures can be implemented to facilitate the functionality described herein. In various embodiments, the software 902 is implemented by hardware such as machine a 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (11.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating system. In this example, the third-party application 966 can invoke the API calls 912 provided by the operating system 904 to facilitate functionality described herein.

Figure 10:
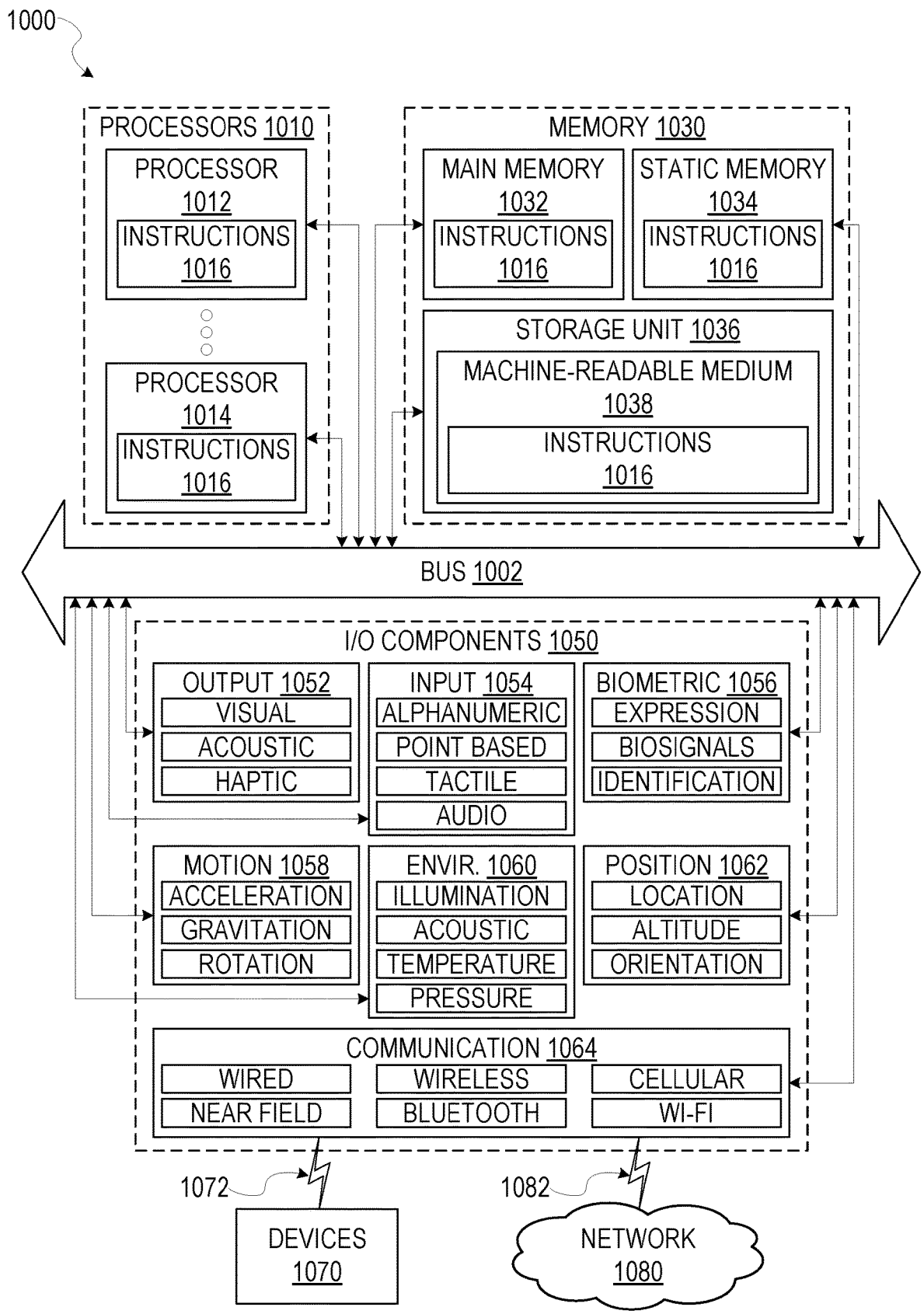
FIG. 10 is a block diagram presenting a diagrammatic representation of a machine in the form of a computer system within which a set of instructions may be executed for causing the machine to perform any of the methodologies discussed herein, according to an example embodiment.

FIG. 10 is a block diagram illustrating components of a machine 1000, according to some embodiments, able to read instructions (e.g., processor executable instructions) from a machine-readable medium (e.g., a non-transitory machine-readable storage medium) and perform any of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1012 and a processor 1014 that may execute the instructions 1016. The term "processor" is intended to include multi-core processors that may comprise two or more independent processors (also referred to as "cores") that can execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple medium (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by processors of the machine 1000 (e.g., processors 1010), cause the machine 1000 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

In various example embodiments, portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FIO network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium should be considered as being transportable from one physical location to another. Additionally, since the machine-readable medium 1038 is tangible, the medium may be considered to be a machine-readable device.

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   accessing a set of frames in a video stream;
   detecting faces depicted within a subset of frames of the set of frames of the video stream, wherein the faces comprise a first face and a second face;
   based on detection of the faces, causing presentation of facial configuration modifier elements within a graphical user interface;
   receiving an indication of a selected facial configuration modifier element of the facial configuration modifier elements;
   segmenting the subset of frames to generate face segments, the face segments comprising a first face and a second face;
   selecting convolutional neural networks trained to modify depicted faces having first facial configurations to have a second facial configuration corresponding to the selected facial configuration modifier element, wherein the first facial configurations correspond to first facial expressions and the second facial configuration corresponds to a second facial expression;
   modifying, using the selected convolutional neural networks, the generated face segments to generate modified face segments each modified face segment comprising a corresponding depicted first face and a corresponding depicted second face of the face segments modified to have the second facial configuration;
   integrating each of the modified face segments into a corresponding frame of the subset of frames; and
   causing presentation of a modified video stream comprising the modified face segments.

2. The method of claim 1, wherein segmenting the subset of frames further comprises:
   cropping the subset of frames to isolate the faces and generate a set of cropped frames; and
   normalizing the set of cropped frames.

3. The method of claim 1, wherein the convolutional neural networks style transfer neural networks trained to transfer images from the first facial configurations to the second facial configuration.

4. The method of claim 1, further comprising:
   based on detection of the faces, causing presentation of facial borders, the facial borders outlining the faces within the set of frames in the video stream; and
   terminating presentation of the facial borders prior to selection of a face modifier element.

5. The method of claim 1, further comprising:
   identifying selection of the first face within the modified video stream; and
   responsive to the selection of the first face, reverting the first modified face segment within the modified video stream to the first face segment within the set of frames in the video stream.

6. The method of claim 1, further comprising:
   publishing, to a network site, the modified video stream as an ephemeral message.

7. A system comprising:
   one or more processors; and
   a non-transitory processor-readable storage device storing processor executable instructions that, when executed by the one or more processors, cause the one or more processors to perform operations comprising:
   accessing a set of frames in a video stream;
   detecting faces depicted within a subset of frames of the set of frames of the video stream, wherein the faces comprise a first face and a second face;
   based on detection of the faces, causing presentation of facial configuration modifier elements within a graphical user interface;
   receiving an indication of a selected facial configuration modifier element of the facial configuration modifier elements;
   segmenting the subset of frames to generate face segments, the face segments comprising a first face and a second face;
   selecting convolutional neural networks trained to modify depicted faces having first facial configurations to have a second facial configuration corresponding to the selected facial configuration modifier element, wherein the first facial configurations correspond to first facial expressions and the second facial configuration corresponds to a second facial expression;
   modifying, using the selected convolutional neural networks, the generated face segments to generate modified face segments each modified face segment comprising a corresponding depicted first face and a corresponding depicted second face of the face segments modified to have the second facial configuration;
integrating each of the modified face segments into a corresponding frame of the subset of frames; and
causing presentation of a modified video stream comprising the modified face segments.

8. The system of claim 7, wherein segmenting the subset of frames comprises:
cropping the subset of frames to isolate the faces and generate a set of cropped frames; and normalizing the set of cropped frames.

9. The system of claim 7, wherein the convolutional neural networks are style transfer neural networks trained to transfer images from the first facial configurations to the second facial configuration.

10. The system of claim 7, the operations further comprising:
based on detection of the faces, causing presentation of facial borders, the facial borders outlining the faces within the set of frames in the video stream; and
terminating presentation of the facial borders prior to selection of a face modifier element.

11. The system of claim 7, the operations further comprising:
identifying selection of the first face within the modified video stream; and
responsive to the selection of the first face, reverting the first modified face segment within the modified video stream to the first face segment within the set of frames in the video stream.

12. The system of claim 7, the operations further comprising:
publishing, to a network site, the modified video stream as an ephemeral message.

13. A non-transitory processor-readable storage medium storing processor executable instructions that, when executed by a processor of a machine, cause the machine to perform operations comprising:

accessing a set of frames in a video stream;
detecting faces depicted within a subset of frames of the set of frames of the video stream, wherein the faces comprise a first face and a second face;
based on detection of the faces, causing presentation of facial configuration modifier elements within a graphical user interface;
receiving an indication of a selected facial configuration modifier element of the facial configuration modifier elements;
segmenting the subset of frames to generate face segments, the face segments comprising a first face and a second face;
selecting convolutional neural networks trained to modify depicted faces having first facial configurations to have a second facial configuration corresponding to the selected facial configuration modifier element, wherein the first facial configurations correspond to first facial expressions and the second facial configuration corresponds to a second facial expression;
modifying, using the selected convolutional neural networks, the generated face segments to generate modified face segments each modified face segment comprising a corresponding depicted first face and a corresponding depicted second face of the face segments modified to have the second facial configuration;
integrating each of the modified face segments into a corresponding frame of the subset of frames; and
causing presentation of a modified video stream comprising the modified face segments.

14. The non-transitory processor-readable storage medium of claim 13, wherein segmenting the subset of frames comprises:
cropping the subset of frames to isolate the faces and generate a set of cropped frames; and
normalizing the set of cropped frames.

15. The method of claim 1 wherein the first facial expressions comprise a frown and the second facial expression is a smile.

* * * * *